United States Patent [19]

Merkel et al.

[11] Patent Number: 5,150,861
[45] Date of Patent: Sep. 29, 1992

[54] VARIABLE SWEEP SIDE FORCE GENERATOR AND ROLL CONTROL DEVICE

[75] Inventors: Edwin W. Merkel, Valley Center; Stephen W. Koontz, Wichita, both of Kans.

[73] Assignee: The Boeing Company, Seattle, Wash.

[21] Appl. No.: 770,729

[22] Filed: Oct. 4, 1991

Related U.S. Application Data

[63] Continuation of Ser. No. 471,139, Jan. 26, 1990, abandoned.

[51] Int. Cl.⁵ ............................................... B64C 5/12
[52] U.S. Cl. .................................. 244/91; 244/90 R; 244/3.27
[58] Field of Search ............... 244/91, 90 R, 46, 3.24, 244/3.27

[56] References Cited

U.S. PATENT DOCUMENTS

| 3,826,448 | 7/1974 | Burk, Jr. ............................ 244/91 |
| 4,145,017 | 3/1979 | Stiklorus ........................... 244/3.25 |
| 4,247,063 | 1/1981 | Jenkins ............................... 244/91 |
| 4,296,894 | 10/1981 | Schnäbele et al. ............... 244/3.1 X |
| 4,378,922 | 4/1983 | Pierce ................................ 244/199 |
| 4,601,442 | 7/1986 | Friedel et al. ................... 244/3.24 |
| 4,739,957 | 4/1988 | Vess et al. ...................... 244/91 X |
| 4,756,253 | 7/1988 | Herring et al. ................. 244/3.21 X |

FOREIGN PATENT DOCUMENTS

496758 8/1919 France .
350374 7/1937 Italy .

Primary Examiner—Charles A. Marmor
Assistant Examiner—Carla Mattix
Attorney, Agent, or Firm—Finnegan, Henderson, Farabow, Garrett & Dunner

[57] ABSTRACT

In an airborne vehicle utilizing tail fins to provide directional control by use of the sideslip maneuver, a variably positionable side force generator airfoil that is positioned in response to the normal load factor of the vehicle to eliminate undesired roll caused by sideslip.

15 Claims, 6 Drawing Sheets

VARIABLE SWEEP SIDE FORCE GENERATOR AND ROLL CONTROL DEVICE

This application is a continuation of application Ser. No. 07/471,139 filed Jan. 26, 1990, now abandoned.

BACKGROUND OF THE INVENTION

1. Field of the Invention

This invention relates to counteracting the undesired roll that is produced in airborne vehicles equipped with side force generators that utilize sideslip as their primary turning maneuver.

2. Description of the Prior Art

Figure 1A:
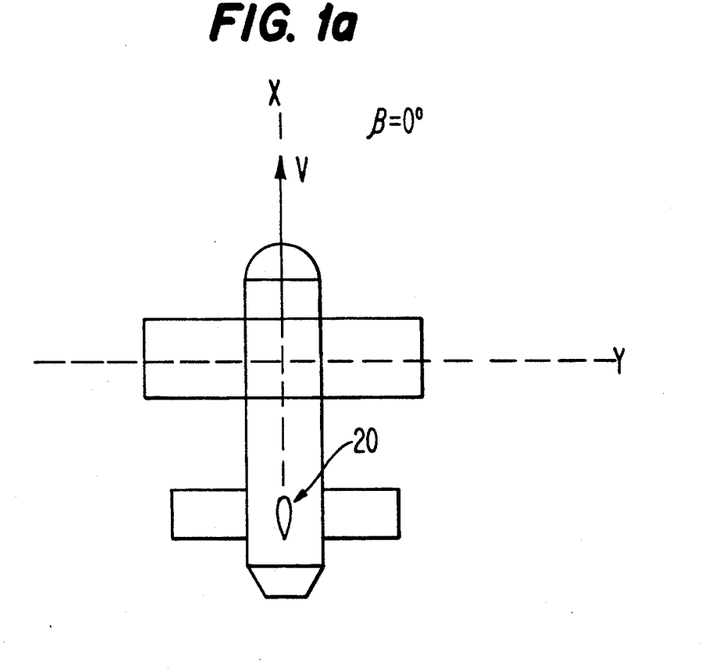
FIG. 1a diagramatically depicts an airborne vehicle with no sideslip.
Figure 1B:
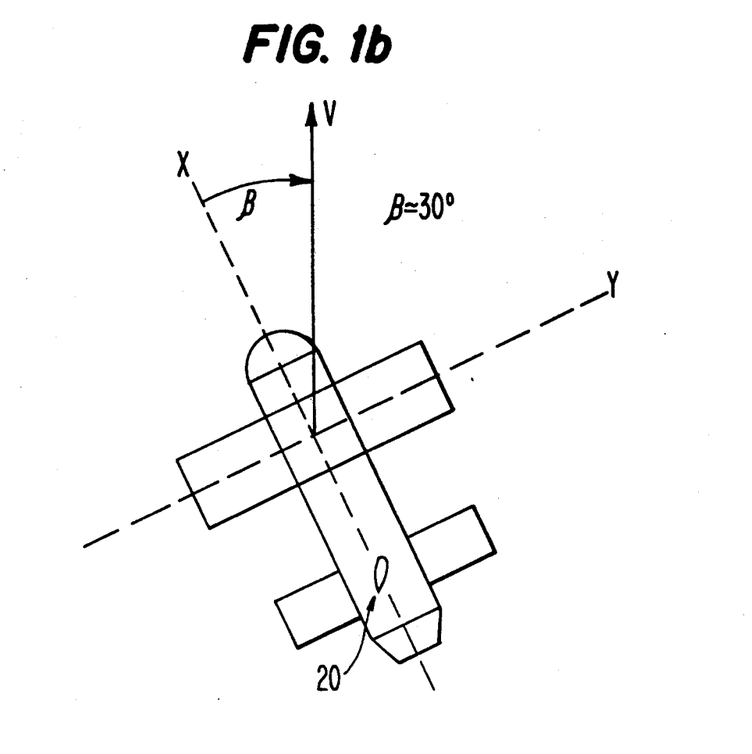
FIG. 1b diagramatically depicts an airborne vehicle with a left yaw and corresponding right—positive—sideslip.
Figure 1C:
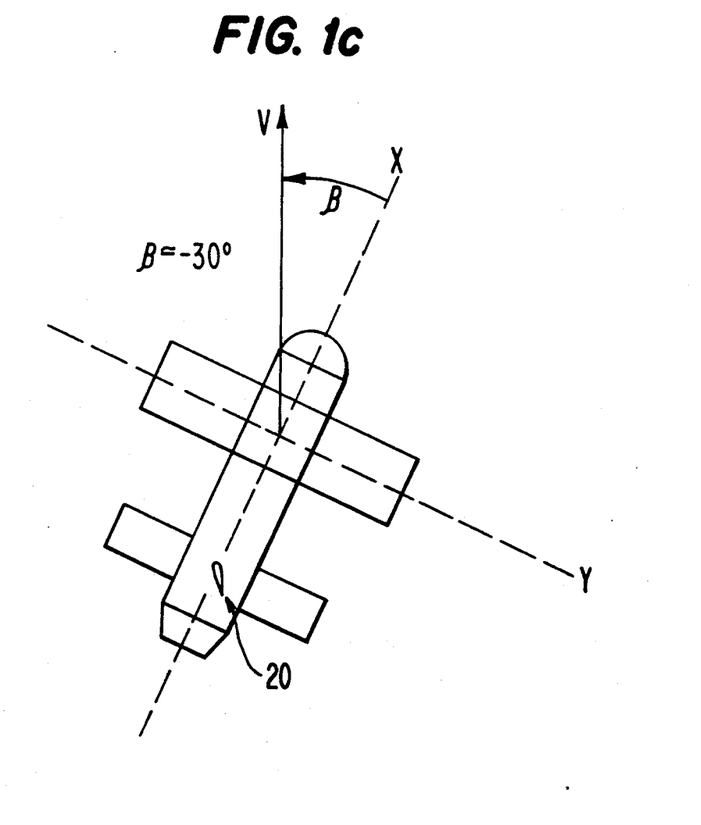
FIG. 1c diagramatically depicts an airborne vehicle with a right yaw and corresponding left—negative—sideslip.

Unlike conventional airplanes that use the roll-to-bank maneuver to achieve directional change, many airborne vehicles—such as missiles or target drones—utilize the sideslip maneuver. Sideslipping or "skidding" is achieved by inducing a yawing moment by deflection of tail fins located near the aft (rear) end of the vehicle. Vertical tail fins act much like a rudder on a conventional aircraft As shown in FIG. 1b, deflecting the vertical tail fins 20 (only the top vertical fin is shown) clockwise (trailing edge to the left) induces a left yawing moment, resulting in a right sideslip with—by definition—a positive sideslip angle $\beta$. This sideslip angle allows a net lateral side force, augmented by a side force generator, to be generated, producing a turning maneuver. The vehicle moves in the direction of the velocity vector V while the nose is displaced to the left. If, as shown in FIG. 1c, the vertical tail fins 20 are deflected counterclockwise (trailing edge to the right), a right yawing moment will be produced with a resultant left sideslip and negative sideslip angle $\beta$.

There are some significant advantages for airborne vehicles to use sideslip for the turning maneuver. Since conventional ailerons on the wings may be eliminated, a simple, one-piece, pivoted, top-mounted wing may be used that conforms to the constraints of the launch device. Further, many of these vehicles carry some type of gyroscopic control device which has to incorporate movement in the X, Y, and Z axes. If the vehicle can be constrained about the X axis; i.e., wings level with no roll, then the computations of the gyroscopic control unit can be reduced, possibly resulting in improved accuracy.

One inherent and long recognized problem with utilizing sideslip is the aerodynamic fact that a nose right yaw—which causes a left sideslip—produces a right roll. A nose left yaw which causes a right sideslip—produces a left roll. The reason for this is the well known dihedral effect, especially pertinent to high wing aircraft. Since the goal is to achieve sideslip without roll, the inherent yet undesired roll must be eliminated to achieve optimum conditions. The only control devices that have been traditionally available to counteract this undesired roll have been—in the absence of ailerons—the horizontal and vertical adjustable tail fins. By asymmetrically deflecting these tail fins in much the same way as wing ailerons, a counteracting rolling moment can be produced. The problem, however, has been that due to their limited size—limited, for example, by launch tube constraints—these horizontal tail fins have not been able to produce a large enough rolling moment to counteract large undesired roll caused by large amounts of sideslip.

Successful attempts have been made to reduce the undesired roll that results from sideslip and can not be corrected through use of the tail fins. Several of these attempts have used side force generators. The patents to Stiklorus and Kavlor teach the basic concept of a side force generator projecting from the bottom of an airborne vehicle. In Stiklorus (U.S. Pat. No. 4,145,017), the side force generator—or keel fin—is fixed in the extended position and ejected at a predetermined time during flight. This keel fin is designed t compensate for the effects of yawing moments and crosswinds during the launch phase of flight. In Kavlor (French patent no. 496,758), the side force generators are spring biased to the extended position and deployed immediately after launch from a launch tube.

Friedal et al. (U.S. Pat. No. 4,601,442) teaches the use of side force generators which are movable from a pre-launch retracted position to a fully extended in-flight position and serve as lateral stabilizers during cruise flight. These stabilizers are rotatably mounted within the fuselage of the airborne vehicle and are deployed to the fully extended position via pre-stressed compression springs. Except for the brief instant that it takes these side force generators or stabilizers to rotate into a fixed position that is essentially perpendicular to the wings, the lateral stabilizers are either recessed within the fuselage or fully extended. No appreciable change in the lateral rolling moment is caused by any transient position of the lateral stabilizers as they are rapidly extended to their spring-loaded, fully deployed position. Once extended, the side force generators or stabilizers taught in Friedal et al. can not be adjusted further.

The consistent problem with all of the prior art side force generators has been their fixed position and resultant fixed aerodynamic characteristics. While effective in certain flight regimes, these fixed structures are often ineffective in others.

SUMMARY OF THE INVENTION

The invention is based on the recognition that prior art side force generators were used purely as fixed stabilizing devices and not as reaction devices. Moreover, the invention resulted from recognition that it is advantageous to use an adjustable side force generator to counter the undesired roll effect that results from using a sideslip maneuver—especially while maneuvering in pitch—to direct an airborne vehicle. The present invention provides an airborne vehicle comprising a main body having a roll axis, a yaw axis, and a pitch axis; means, connected to said main body, for providing lift; means, connected to said main body, for effecting yaw attitude control about said yaw axis to induce sideslip; means, connected to said main body, for effecting roll attitude control about said roll axis to counteract said sideslip, said roll attitude control means comprising at least an airfoil variably positionable in a geometric plane defined by said yaw and roll axes; and means for selectively positioning said airfoil in response to a normal load factor to produce a roll effect to counteract undesired roll effects inherent with sideslip.

BRIEF DESCRIPTION OF THE DRAWINGS

The manner by which the above objects, and other objects, features, and advantages of the present invention are attained will be fully apparent from the following detailed description when it is considered in view of the drawings, wherein.

DETAILED DESCRIPTION OF THE PREFERRED EMBODIMENTS

Preferred embodiments of this invention will be described with reference to the accompanying drawings.

Figure 2:
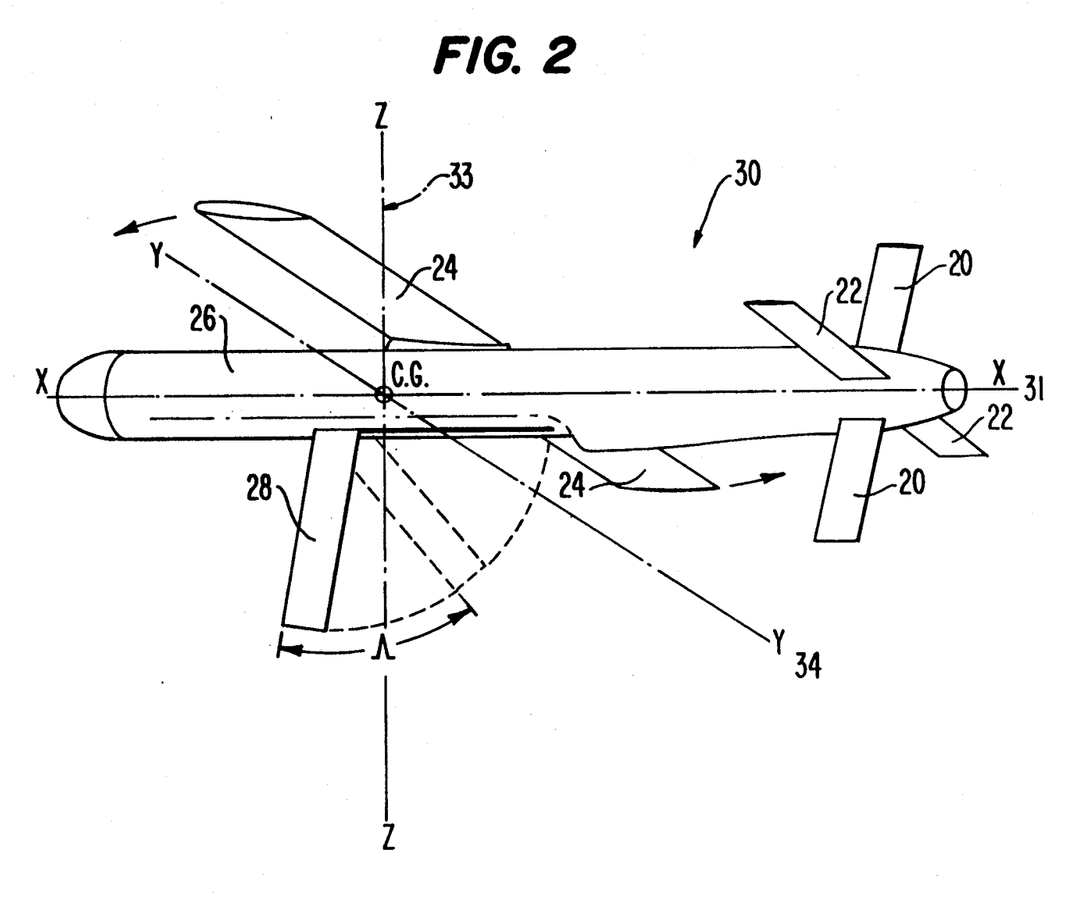
FIG. 2 is a perspective view of a preferred embodiment of the present invention.

In accordance with the invention, FIG. 2 shows a preferred embodiment wherein an airborne vehicle 30 comprises a main body or fuselage 26, having a roll axis 31, a yaw axis 33, and a pitch axis 34. A top-mounted, pivoted, one-piece wing 24, connected to the main body, serves as a means for providing lift. Two adjustable vertical tail fins 20, also connected to the main body, serve as a means for effecting yaw attitude control about the yaw axis 33. Two adjustable horizontal tail fins 22, also connected to the main body, serve as means for effecting roll attitude control about the roll axis 31 when antisymmetrically displaced, and as a means for effecting pitch attitude control about the pitch axis 34 when symmetrically displaced. A variable sweep side force generator (hereinafter referred to as "VSSFG") 28, also connected to the main body, serves as a means for effecting roll attitude control about the roll axis 31. The VSSFG is variably positionable in a geometric plane defined by the yaw axis 33, and the roll axis 31, and is primarily used to counteract undesired roll effects inherent with sideslip.

Figure 3:
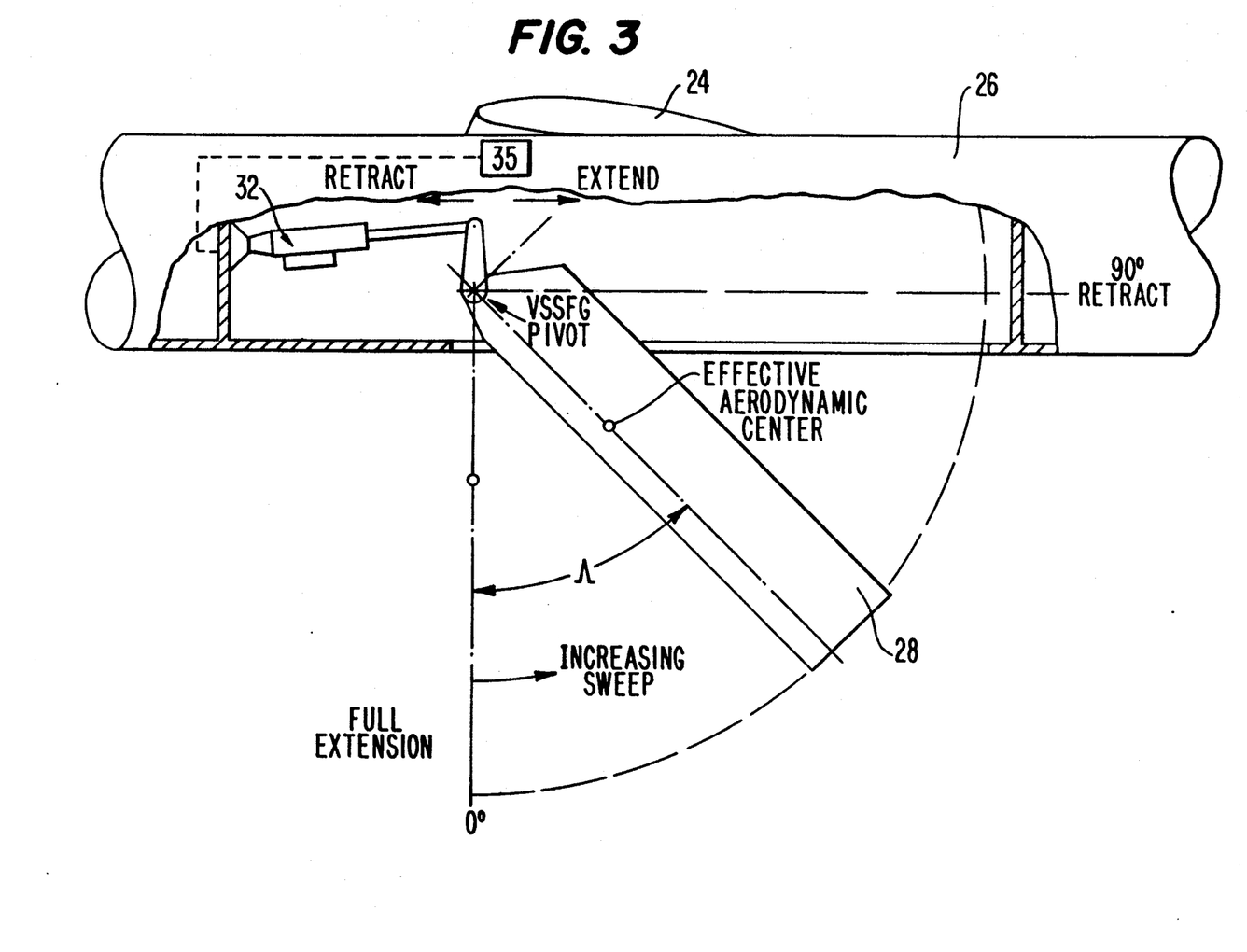
FIG. 3 is a partial cut away side view of a positioning means assembly for the variable sweep side force generator of the preferred embodiment of FIG. 2.

With reference now to FIG. 3, the VSSFG 28 may be extended from a fully retracted 90 degree position to a fully extended 0 degree position—or to any intermediate position in between—by a positioning means assembly 32. The positioning means assembly shown is an electromechanical linear actuator, but any suitable positioning mechanism that is compatible with the airborne vehicle systems may be used. Control means 35 utilizes load factor information to determine the amount of VSSFG extension required to either return the vehicle to a no-roll, wings level attitude, or to return it to a roll attitude wherein the counter roll effects of the horizontal tail fins are sufficient to achieve a no-roll, wings level attitude.

The control means may consist of any known "G-meter" such as a Sunstrand QA 1200 tri-axis accelerometer, the output of which is converted into an appropriate electrical signal. This signal is then connected to the electromechanical input of the positioning means 32, such that a positive "G" reading approaching a positive limit load factor will cause the positioning means to further extend the VSSFG to a position that will null the rolling moment. In a similar manner, a negative "G" reading approaching a negative limit load factor will cause the positioning means to fully retract the VSSFG. For "G" values in between this range, the VSSFG will be driven to that sweep angle that will null the rolling moment due to sideslip.

The VSSFG pivot point is located such that the locus of its aerodynamic centers is in close proximity to the aircraft center of gravity (C.G.). This location may be varied to achieve different results which may be advantageous in circumstances such as fine tuning the interdependent relationship between the directional stability and sideforce desired. The location of the VSSFG pivot point is design specific and is driven primarily by the levels of sideforce and directional stability required.

In the best mode contemplated, the VSSFG provides a synergistic source of roll control by working in conjunction with an elastic wing. The elasticity of the wing creates a geometric dihedral when the elastic wing is under a positive load, and a geometric anhedral when the elastic wing is under a negative load. The effects of the elastic wing working in conjunction with the VSSFG will now be explained with reference to the graphs shown as FIGS. 4 and 5, with the symbology of these graphs being disclosed just prior to the claims.

Figure 4:
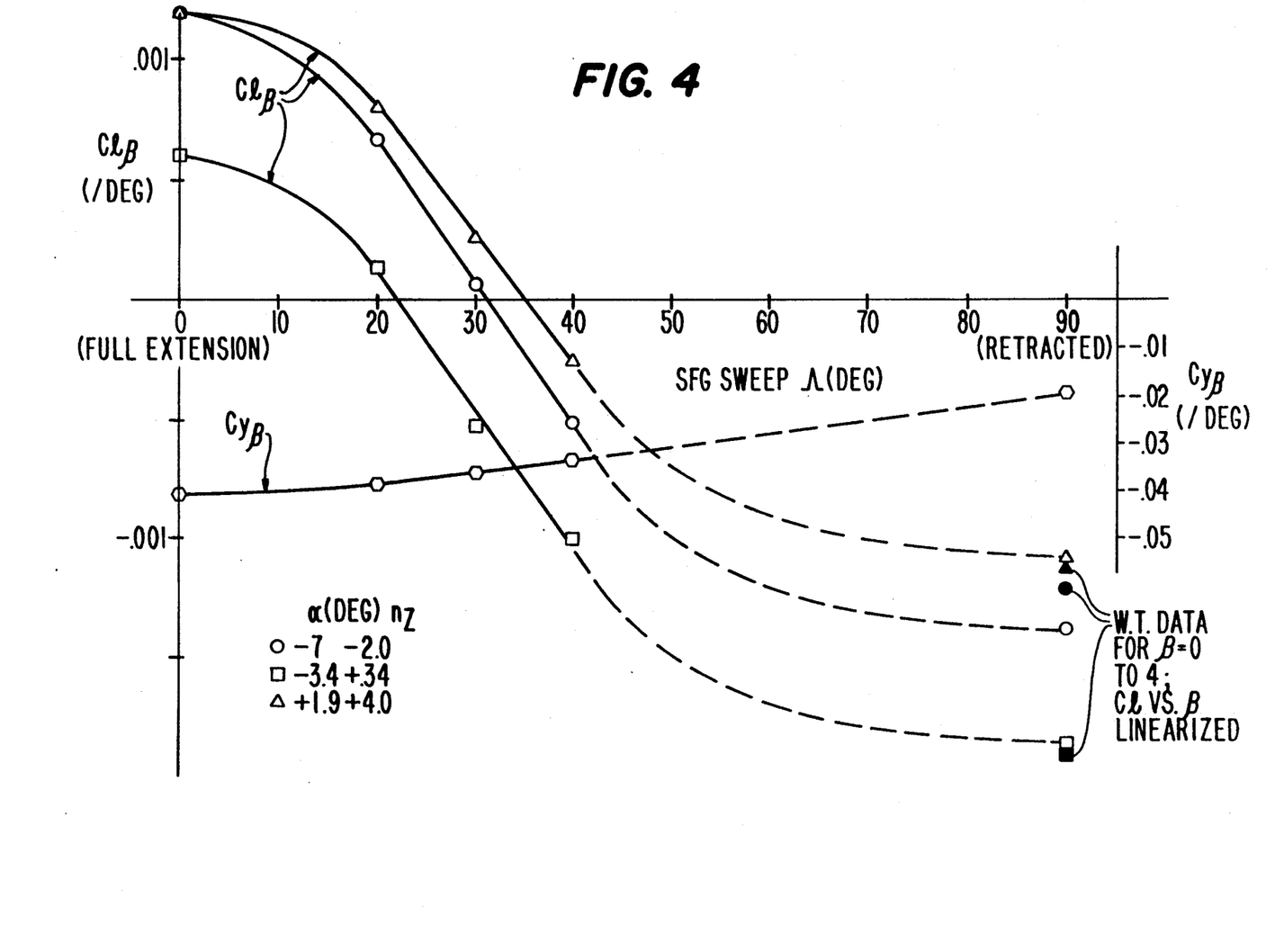
FIG. 4 is a graph of rate of change of rolling moment coefficient Cl with sideslip angle $\beta$ as a function of sweep angle $\Lambda$ of the variable sweep side force generator (VSSFG) of the invention.

FIG. 4 is a graph of wind tunnel data showing rate of change of rolling moment coefficient Cl with sideslip angle $\beta$ as a function of VSSFG sweep angle $\Lambda$ for a baseline aircraft (VSSFG and rigid wing). In the graph, the vertical axis is the rate of change of the rolling moment coefficient for fixed sideslip angles between 0 and 4 degrees. The horizontal axis is simply the angle of sweep $\Lambda$ of the VSSFG, with 90 degrees being fully retracted and 0 degrees being fully extended.

Since FIG. 4 depicts relationships for an airborne vehicle configuration with a positive (right) sideslip, that means that the positive sideslip induces left (negative) roll. Hence, it is desirable to produce a positive (right) rolling moment to counteract the undesired roll. FIG. 4 depicts curves for three separate airborne vehicle angles of attack $\alpha$ at which the vehicle is trimmed by a symmetrical deflection of the horizontal fins. The rolling moment derivative Cl$\beta$ of the airborne vehicle can be nulled to zero with the VSSFG extended to between 22 and 35 degrees, depending upon the vehicle's angle of attack. The airborne vehicle's angle of attack $\alpha$ is understood to be the angle formed between the fuselage reference line (FRL) and the local undisturbed airflow direction and corresponds to a discrete load factor nz at a given flight velocity, as noted in FIG. 4. If the angle of sweep of the VSSFG were to be increased (retracted more), there would not be a sufficient positive (right) counter roll effect to offset the negative (left) roll induced by the right sideslip. If the angle of sweep of the VSSFG were to be reduced (extended further), there would be too much positive (right) counter roll effect, resulting in an undesired positive (right) roll.

FIG. 4 also shows the rate of change of side force coefficient Cy with sideslip angle $\beta$ as a function of VSSFG sweep $\Lambda$. This is shown as the Cy$\beta$ curve, with the units of the vertical axis shown on the right side of the graph, and shows that the sweeping of the VSSFG between the roll null angles of 22 to 35 degrees does not have an appreciable effect on the net side force available, and thus would not significantly compromise the turning maneuver. Furthermore, if the VSSFG is mounted such that its locus of aerodynamic centers, as it sweeps between 0 and 90 degrees, is in close proximity to the vehicle center of gravity (with respect to the X axis), the yawing moment produced by the VSSFG will have minimal effect on the directional stability of the vehicle as the VSSFG is swept throughout its range.

Figure 5:
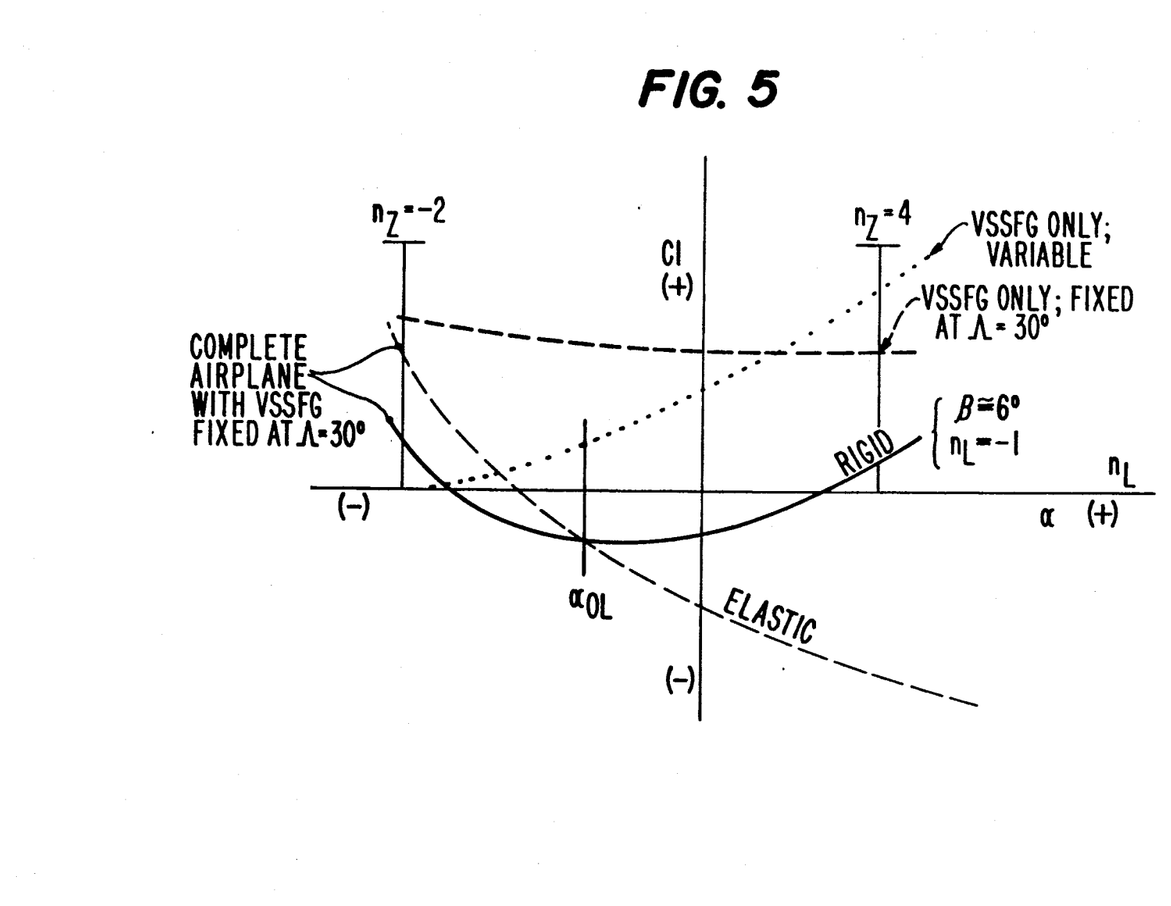
FIG. 5 is a graph of residual rolling moment Cl versus angle of attack $\beta$ for both a rigid and an elastic wing, for a fixed sideslip angle $\beta$.

A typical variation of the rolling moment coefficient Cl versus vehicle angle of attack $\alpha$, at a given trimmed sideslip angle $\beta$ of approximately 6 degrees, producing a fixed lateral load factor $n_L$ of $-1$, is shown in FIG. 5 for both the rigid and the elastic wing. The RIGID and ELASTIC curves represent the residual rolling moment that must be trimmed out after the airborne vehicle has been trimmed directionally to zero yawing moment at a given steady sideslip angle, developing a given lateral load factor, and with the VSSFG sweep angle $\Lambda$ set at 30 degrees. The contribution of the VSSFG fixed at 30 degrees is superimposed, illustrating that at a fixed sweep angle, rolling moment effect is essentially invariant with wing angle of attack over the angle of attack range shown. The geometric shape of the wing—a geometric dihedral produced when the elastic wing is under a positive normal load factor, and a geometric anhedral produced when the elastic wing is under a negative normal load factor—is the dominant variable and determines the character of the Cl versus $\alpha$ curve.

In the configuration depicted in FIG. 5, the airborne vehicle would have its nose displaced to the left of the velocity vector by approximately 6 degrees, resulting in a right sideslip which would cause, in a no load flight condition, a left (negative) rolling moment. Increasing the normal load factor would cause the elastic wing to bend into an increased dihedral configuration, resulting in an even greater left (negative) rolling moment. The greater the dihedral and correspondingly greater left (negative) rolling moment, the greater the need for VSSFG extension and its correspondingly greater right (positive) rolling moment effect to counter the undesired left (negative) roll effects of the dihedral wing. At some point, too much of a positive load factor will produce too great of a negative rolling moment that cannot be counteracted by the positive rolling moment effects of the VSSFG. If the tail fins can not produce enough of a positive roll effect to assist the VSSFG in counteracting the negative roll effects, the normal load factor must be reduced (to reduce the dihedral) or the attitude of the vehicle must be altered in order to prevent the vehicle from becoming uncontrollable. Thus is described one edge of the operating envelope.

Decreasing the normal load factor would have the opposite effect. A reduced normal load factor would reduce the amount of wing dihedral, resulting in a lesser amount of induced negative (left) roll, requiring less counteracting positive (right) roll from the VSSFG. Once the normal load factor becomes negative, the elastic wing will bend into an anhedral configuration which will result in an induced positive (right) rolling moment, increasing with increasing negative load factor. As maximum negative load factor is approached, the VSSFG should be fully retracted since it is not capable of producing a counteracting negative (left) rolling moment with positive sideslip. Any extension of the VSSFG in this vehicle configuration would only add to the undesired positive (right) roll. If the tail fins are not able to produce enough of a negative rolling moment, the attitude of the vehicle must be changed or the negative load factor must be reduced (to reduce or eliminate the anhedral) in order to prevent the vehicle from becoming uncontrollable. Thus is described another edge of the operating envelope.

From the proceeding discussion and graphs, it will be realized that full VSSFG extension (sweep angle $\Lambda=0$) is used to produce a large positive (right) counteracting rolling moment, with positive sideslip, when a large positive normal load factor is acting on the airborne vehicle which induces a large negative (left) rolling moment. These two rolling moments should cancel each other, resulting in a no-roll, wings level attitude. Similarly, full VSSFG retraction (sweep angle $\Lambda=90$) is used when a sufficient negative normal load factor is acting on the airborne vehicle, since any extension of the VSSFG would only serve to add to the undesired positive (right) roll effect induced by the anhedral wing configuration with a negative angle of attack and positive sideslip. With full VSSFG retraction, the horizontal tail fins must be used to roll the vehicle into a no-roll, wings level attitude.

The VSSFG is uniquely suited to simple, low cost, unmanned flight vehicles that employ sideslip as a primary turning maneuver. Any suitable positioning mechanism that is compatible with the vehicle systems may be used to position the VSSFG. The locus of aerodynamic centers of the VSSFG may be adjusted to produce different aerodynamic effects compatible with the teachings of this disclosure. Different configurations and placement of the tail fins may be used to achieve similar aerodynamic effects, and asymmetric deflection of both the horizontal and the vertical tail fins may be used to achieve a rolling moment. The tail fins need not be strictly vertical or horizontal, and may be configured in any appropriate manner to achieve pitch, yaw, and roll attitude control. It should be understood that the detailed description and examples, while indicating presently preferred embodiments of the present invention, are given by way of illustration only. Various modifications and changes may be made within the scope of the present invention.

The following chart may be used to interpret the symbology of any of the Figures:

L=ClqSwbw: Rolling moment (ft-lbs)
Y=CyqSw: Side force (lbs)
N=CnqSw: Yawing moment (ft-lbs)
q=dynamic pressure (lb/ft$^2$)
Sw=wing area (ft$^2$)
bw=wing span (ft)
$\alpha$=angle of attack (deg), referenced to the FRL
$\beta$=angle of sideslip (deg)
$n_L$=Y/W: Lateral load factor
$n_Z$=L/W: Normal load factor
Cl=rolling moment coefficient
Cy=side force coefficient
Cn=yawing moment coefficient
$Cl_\beta$=dCl/d$\beta$: Rate of change of rolling moment coefficient Cl with sideslip angle $\beta$
$Cy_\beta$=dCy/d$\beta$: Rate of change of side force coefficient Cy with sideslip angle $\beta$
$\Lambda$=angle of VSSFG extension (deg)
C.G.=center of gravity
FRL=fuselage reference line. A longitudinal line in the plane of symmetry and parallel to the longitudinal axis 31 in FIG. 2.
W=weight of airborne vehicle.

What is claimed is:

1. An airborne vehicle comprising:
a main body having a roll axis, a yaw axis, and a pitch axis;
means, connected to said main body, for providing lift;

means, connected to said main body, for effecting yaw attitude control about said yaw axis to induce sideslip;

means, pivotably connected to said main body, for effecting roll attitude control about said roll axis to counteract said sideslip, said roll attitude control means comprising at least an airfoil variably positionable between a retracted position and a plurality of extended positions in a geometric plane defined by said yaw and roll axes; and means responsive to a normal load factor for automatically positioning said airfoil in a position selected to produce a roll effect to counteract undesired roll effects inherent with sideslip.

2. The airborne vehicle of claim 1, wherein said lift providing means comprises a top-mounted, one-piece wing formed of elastic materials such that said wing forms a geometric dihedral when exposed to a positive normal load factor.

3. The airborne vehicle of claim 1, wherein said lift providing means comprises a top-mounted, one-piece wing formed of elastic materials such that said wing forms a geometric anhedral when exposed to a negative normal load factor.

4. The airborne vehicle of claim 1, wherein said yaw attitude control means comprises fins disposed in the plane of said roll and yaw axes.

5. The airborne vehicle of claim 1, wherein said roll attitude control means further comprises fins disposed in the plane of said roll and pitch axes.

6. The airborne vehicle of claim 1, wherein said positioning means of said variably positionable airfoil comprises means for positioning said airfoil between an at least partially retracted position within said main body and a more extended position such that a greater amount of said airfoil surface area is exposed with extension.

7. The airborne vehicle of claim 1, wherein said positioning means comprises means for detecting load factor forces and means responsive to detected load factor forces for automatically generating a positioning signal to effect movement of said airfoil to a selected position.

8. An airborne vehicle, comprising:
a main body;
a top-mounted, one-piece wing connected to said main body for providing lift;
a plurality of fins connected to said main body for providing pitch, yaw, and roll attitude control;
a variably positionable side force generator airfoil pivotably connected to said main body for selective extension from a fully retracted position within said main body to a fully extended position that is substantially perpendicular to the retracted position;
means in said main body for positioning said airfoil to any intermediate position between said fully retracted position and said fully extended position; and
control means, responsive to load factor forces acting on said main body, for controlling said positioning means to dispose said airfoil in positions between said retracted and extended positions substantially to maintain said main body in a wings level, no-roll attitude during sideslip.

9. The airborne vehicle of claim 8, wherein said plurality of fins can be deflected to effect yaw to induce sideslip to the main body.

10. The airborne vehicle of claim 9, wherein said main body defines independent and orthogonal roll, yaw, and pitch axes.

11. A method of turning an airborne vehicle using sideslip, said airborne vehicle defining independent and orthogonal roll, yaw and pitch axes, comprising the steps of:
(a) deflecting tail fins on said airborne vehicle to effect yaw which results in sideslip, said sideslip producing a rolling moment;
(b) automatically detecting changes in load factors on the airborne vehicle;
(c) electrically generating a positioning signal responsive to changes in said load factors; and
(d) automatically positioning a side force generator airfoil in response to said positioning signal, said side force generator producing a force in the plane defined by the roll and yaw axes to counteract said rolling moment during sideslip.

12. The method of claim 11, wherein said positioning of said airfoil occurs in a plurality of positions from a fully retracted to fully extended position and any intermediate position between said fully retracted and said fully extended positions.

13. The method of claim 12, wherein said positions are in the plane defined by the yaw and roll axes of the airborne vehicle.

14. An aircraft comprising:
an elongated body defining independent and orthogonal roll, yaw and pitch axes and having a primary airfoil for generating lift;
adjustable fins mounted on the body for inducing sideslip to the body by effecting yaw;
a variable sweep side force generator mounted on the body and including a variably positionable airfoil movable in a plurality of predetermined positions between a sweep angle of 0° to 90° in the plane defined by the yaw and roll axes to counter roll introduced to the aircraft by adjustment of the fins to induce sideslip; and
a controller on the body for sensing load factors of the aircraft and for controlling the position of the side force generator airfoil in response to the sensed load factors.

15. A method of turning an airborne vehicle using sideslip, said airborne vehicle defining independent and orthogonal roll, yaw and pitch axes, comprising the steps of:
(a) deflecting tail fins on said airborne vehicle to effect yaw which results in sideslip, said sideslip producing a rolling moment;
(b) detecting changes in load factors on the airborne vehicle;
(c) generating a positioning signal responsive to changes in said load factors; and
(d) positioning a side force generator airfoil in response to said positioning signal to counteract said rolling moment during sideslip, said positioning of said airfoil occurring in a plurality of positions from a fully retracted to fully extended position and any intermediate position between said fully retracted and said fully extended positions, and said positions being in the plane defined by the yaw and roll axes of the airborne vehicle.

* * * * *